United States Patent
Yusa et al.

(10) Patent No.: US 12,159,077 B2
(45) Date of Patent: Dec. 3, 2024

(54) DISPLAY CONTROL DEVICE, DISPLAY SYSTEM, AND DISPLAY CONTROL METHOD

(71) Applicant: Panasonic Intellectual Property Management Co., Ltd., Osaka (JP)

(72) Inventors: Junya Yusa, Kanagawa (JP); Kazuki Kuzu, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 101 days.

(21) Appl. No.: 17/953,802

(22) Filed: Sep. 27, 2022

(65) Prior Publication Data

US 2023/0111941 A1     Apr. 13, 2023

(30) Foreign Application Priority Data

Sep. 30, 2021  (JP) ................. 2021-160425

(51) Int. Cl.
| | |
|---|---|
| *G06F 3/14* | (2006.01) |
| *B60K 35/00* | (2024.01) |
| *B60K 35/23* | (2024.01) |
| *G09G 3/00* | (2006.01) |
| *G09G 3/20* | (2006.01) |

(52) U.S. Cl.
CPC ............ *G06F 3/1431* (2013.01); *B60K 35/00* (2013.01); *G09G 3/002* (2013.01); *G09G 3/2096* (2013.01); *B60K 35/23* (2024.01); *G09G 2320/066* (2013.01); *G09G 2320/0666* (2013.01); *G09G 2340/14* (2013.01); *G09G 2360/04* (2013.01); *G09G 2360/144* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2017/0039919 A1* | 2/2017 | Wu | G09G 5/10 |
| 2017/0193925 A1* | 7/2017 | Park | G09G 3/3611 |
| 2019/0025584 A1 | 1/2019 | Dai et al. | |
| 2019/0130869 A1* | 5/2019 | Chang | G02B 27/017 |
| 2019/0168668 A1* | 6/2019 | Chan | B60Q 9/00 |
| 2019/0378449 A1* | 12/2019 | VanderWel | G09G 3/2003 |

FOREIGN PATENT DOCUMENTS

| | | |
|---|---|---|
| JP | 5917974 | 5/2016 |
| JP | 6729636 | 7/2020 |

* cited by examiner

*Primary Examiner* — Kee M Tung
*Assistant Examiner* — Jed-Justin Imperial
(74) *Attorney, Agent, or Firm* — Greenblum and Bernstein, P.L.C.

(57) ABSTRACT

A display control device is a device that controls four display devices provided in an automobile, and includes: four image generating units that generate four on-screen displays; a setting unit that sets a color display mode as a set display mode; and an image processing unit that unifies a color display mode of each of the four on-screen displays generated to the set display mode, and display each of the four on-screen displays that have been unified to the set display mode on a different one of the four display devices.

9 Claims, 7 Drawing Sheets

FIG. 3

| Information on original color | Information on color after conversion | | |
|---|---|---|---|
| Normal mode | First mode | Second mode | Third mode |
| RGB = (r1, g1, b1) | RGB = (r11, g11, b11) | RGB = (r21, g21, b21) | RGB = (r31, g31, b31) |
| RGB = (r2, g2, b2) | RGB = (r12, g12, b12) | RGB = (r22, g22, b22) | RGB = (r32, g32, b32) |
| RGB = (r3, g3, b3) | RGB = (r13, g13, b13) | RGB = (r23, g23, b23) | RGB = (r33, g33, b33) |
| ⋮ | ⋮ | ⋮ | ⋮ |
| First color set | Second color set | Second color set | Second color set |

FIG. 4

| Information on original color | Information on color after conversion ||| |
|---|---|---|---|
| Normal mode | First mode | Second mode | Third mode |
| RGB = (r1, g1, b1) | RGB = (r11, g11, b11) | RGB = (r21, g21, b21) | RGB = (r31, g31, b31) |
| RGB = (r2, g2, b2) | RGB = (r12, g12, b12) | RGB = (r22, g22, b22) | RGB = (r32, g32, b32) |
| RGB = (r3, g3, b3) | RGB = (r13, g13, b13) | RGB = (r23, g23, b23) | RGB = (r33, g33, b33) |
| ⋮ | ⋮ | ⋮ | ⋮ |
| Conspicuous color | RGB = (r01, g01, b01) | RGB = (r02, g02, b02) | RGB = (r03, g03, b03) |
| First color set | Second color set | Second color set | Second color set | d1

DISPLAY CONTROL DEVICE, DISPLAY SYSTEM, AND DISPLAY CONTROL METHOD

CROSS REFERENCE TO RELATED APPLICATION

The present application is based on and claims priority of Japanese Patent Application No. 2021-160425 filed on Sep. 30, 2021.

FIELD

The present disclosure relates to a display control device that controls displaying by a display device.

BACKGROUND

Conventionally, an image processing device for converting a color that is hardly distinguishable to a person with color-vision deficiency, such as a person with color weakness or a person with color blindness, into another color that is readily distinguishable has been proposed as a display control device (for example, refer to Patent Literature (PTL) 1).

CITATION LIST

Patent Literature

PTL 1: Japanese Patent No. 5917974

SUMMARY

However, the display control device according to PTL 1 described above can be improved upon.

In view of this, the present disclosure provides a display control device, and so on, that can improve upon the above related art. A display control device according to an aspect of the present disclosure is a display control device that controls a plurality of display devices provided in an automobile, and includes: a plurality of image generating circuits that generate a plurality of on-screen displays; a setting circuit that sets a color display mode as a set display mode; and an image processing circuit that unifies a color display mode of each of the plurality of on-screen displays generated to the set display mode, and displays each of the plurality of on-screen displays that have been unified to the set display mode on a different one of the plurality of display devices.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The display control device according to the present disclosure can improve upon the above related art.

Further advantages and effects according to the aspect of the present disclosure will become apparent from the following description and the accompanying drawings. While such advantages and/or effects are each provided by several embodiments and features described in the following description and the accompanying drawings, all of the advantages and/or effects need not necessarily be provided in order to obtain one or more of the same features.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a diagram illustrating an example of color conversion information according to an embodiment.

FIG. 4 is a diagram illustrating another example of color conversion information according to an embodiment.

Figure 1:
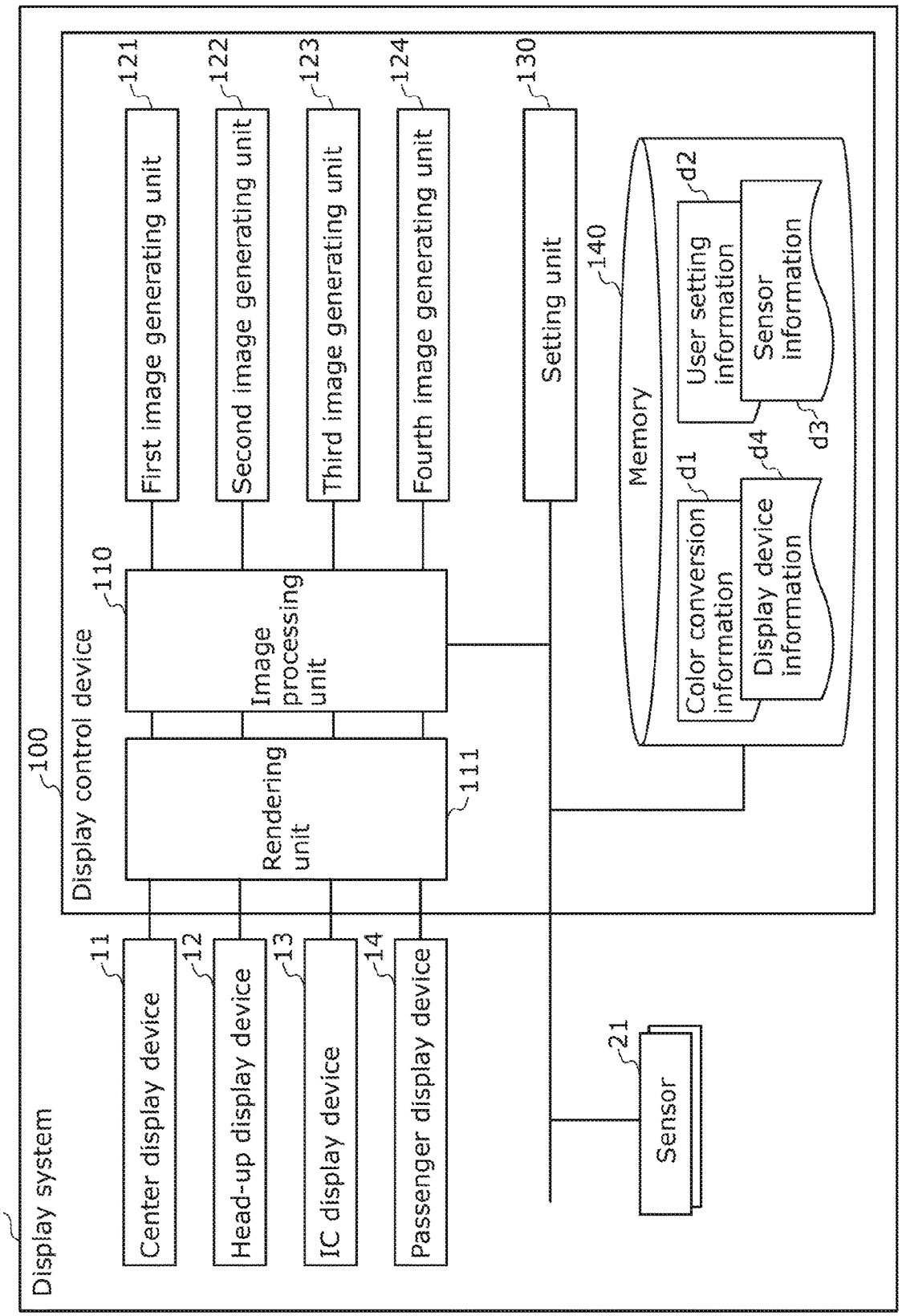
FIG. 1 is a block diagram illustrating a configuration example of a display system according to an embodiment.

DESCRIPTION OF EMBODIMENTS (Underlying Knowledge Forming Basis of Present Disclosure)

In the display control device according to PTL 1 described above, an on-screen display is displayed on an output device being one display device. In addition, color conversion is performed with respect to the on-screen display. In the present disclosure, the on-screen display is an image or a video. However, recent automobiles tend to be provided with a plurality of display devices, and an on-screen display generated by individual application software is displayed on each of the plurality of display devices. Therefore, in the display control device according to PTL 1 described above, when a plurality of pieces of application software generate a plurality of mutually different on-screen displays and the on-screen displays are respectively displayed on the plurality of display devices, a burden of converting color may potentially increase. Specifically, the display control device must include a configuration for individually setting a color and converting a color according to the setting with respect to each of the plurality of on-screen displays. As a result, a burden of development, design, manufacturing, and the like of the display control device increases. In addition, since a user must individually operate color settings with respect to each of the plurality of on-screen displays, a burden of operations of the user increases. Furthermore, when settings differ from one on-screen display to the next, a sense of unity of colors is impaired.

In order to solve such a problem, a display control device according to an aspect of the present disclosure is a display control device that controls a plurality of display devices provided in an automobile, and includes: a plurality of image generating units configured to generate a plurality of on-screen displays; a setting unit configured to set a color display mode as a set display mode; and an image processing unit configured to unify a color display mode of each of the plurality of on-screen displays generated to the set display mode, and display each of the plurality of on-screen displays that have been unified to the set display mode on a different one of the plurality of display devices.

Accordingly, it is possible to decrease the burden of converting color. Specifically, when a set display mode is set by the setting unit, the color display modes of the plurality of on-screen displays generated by the plurality of image generating units are unified to the set display mode. Therefore, a configuration for converting a color display mode need not be individually provided with respect to each of the plurality of on-screen displays and the color display modes of the plurality of on-screen displays can be collectively converted into the set display mode by the image processing unit. In addition, when the setting by the setting unit is performed in accordance with an input operation by a user who is a passenger on an automobile or the like, the user can be spared of having to individually operate settings of a color display mode with respect to each of the plurality of on-screen displays. Therefore, each color display mode of the plurality of on-screen displays can be readily converted in a unified manner. In other words, a sense of unity of the color display modes can be prevented from becoming impaired. As a result, from the perspective of development, design, or manufacturing of the display control device as well as the perspective of use of the display control device by the user, a burden of color conversion can be reduced.

Furthermore, the setting unit may be configured to set a second color set, among a plurality of color sets, as the set display mode, and the image processing unit may be configured to unify the color display mode of each of the plurality of on-screen displays to the set display mode by: referring to color conversion information which indicates, in association with each other, each color indicated in a first color set among the plurality of color sets and each color indicated in the second color set; and for each of the plurality of on-screen displays, converting a color which is included in the on-screen display and indicated in the first color set into a color which is indicated in the second color set and associated with the color indicated in the first color set.

Accordingly, a color included in each of the plurality of on-screen displays is converted into a different color in the second color set of the color conversion information and which is associated with the color included in each of the plurality of on-screen displays. Therefore, when each color indicated in the second color set is readily distinguishable by a person with color-vision deficiency, the plurality of on-screen displays can be readily collectively converted into an on-screen display that is readily distinguishable by the person with color-vision deficiency.

Furthermore, the image processing unit may be further configured to, when a specific color is associated with the second color set and a component image that satisfies a predetermined condition is included in each of the plurality of on-screen displays, convert a color of the component image into the specific color.

Accordingly, for example, when a specific color is a conspicuous color to a person with color-vision deficiency, a color of a highly-important component image for alerting a passenger who is the person with color-vision deficiency among respective component images included in the plurality of on-screen displays can be converted into the conspicuous color to the passenger. Note that a component image that satisfies a predetermined condition is a highly-important component image as described above. Therefore, when an importance is assigned to each component image included in the plurality of on-screen displays, a component image that satisfies a predetermined condition is a component image assigned an importance that is equal to or higher than a threshold.

Furthermore, the plurality of color sets may include the first color set and a plurality of candidate color sets which are mutually different. The setting unit may be configured to set one candidate color set among the plurality of candidate color sets as the second color set. For each of the plurality of candidate color sets, the color conversion information may indicate, in association with each other, each color indicated in the first color set and each color indicated in the candidate color set. For example, the first color set may be a color set for a person with normal color vision, and the plurality of candidate color sets may be color sets for persons with color vision deficiencies. Here, each of the plurality of candidate color sets is for a different type of color vision deficiency.

Accordingly, in accordance with a type of color-vision deficiency, the plurality of on-screen displays displayed on the plurality of display devices can be readily collectively converted into an on-screen display that is readily distinguishable by a person with that type of color-vision deficiency. Examples of types of color-vision deficiency include protanopia and deuteranopia. When the passenger is a person with protanopia as a color-vision deficiency, by having the setting unit set the second color set that is a candidate color set for a person with protanopia as a color-vision deficiency, the plurality of on-screen displays can be readily collectively converted into an on-screen display that is readily distinguishable by the person with that color-vision deficiency.

Furthermore, the image processing unit may be further configured to adjust at least one of a contrast or an edge of colors of the plurality of on-screen displays to unify an intensity of the at least one of the contrast or the edge.

Accordingly, an intensity of a contrast of each of the plurality of on-screen displays can be readily unified. Alternatively, an intensity of an edge of each of the plurality of on-screen displays can be readily unified.

Furthermore, the image processing unit may be further configured to obtain, from a sensor, an environment parameter indicating an environment in which the plurality of display devices are disposed, and change the color display mode of each of the plurality of on-screen displays according to the environment parameter.

Accordingly, even when the environment changes, the plurality of on-screen displays can be made readily visible in the environment. Hereinafter, embodiments will be specifically described with reference to the Drawings.

Note that each of the following embodiments shows a generic or a specific example of the present disclosure. The numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in any one of the independent claims that indicate the broadest concepts are described as optional structural components.

Furthermore, the respective figures are schematic illustrations and are not necessarily precise illustrations. In the figures, the same reference signs are given to the same structural components.

EMBODIMENT

FIG. 1 is a block diagram illustrating a configuration example of a display system according to an embodiment.

Display system 1 according to the present embodiment is a system that displays a plurality of on-screen displays so as to be readily distinguishable by both persons with normal color vision and persons with color-vision deficiency. As illustrated in FIG. 1, display system 1 includes center display device 11, head-up display device 12, instrument cluster (IC) display device 13, passenger display device 14, sensor 21, and display control device 100.

Center display device 11, head-up display device 12, IC display device 13, and passenger display device 14 are each a display device which is provided in an automobile and which displays an on-screen display based on control by display control device 100. These display devices may be liquid-crystal display devices, organic electroluminescent (EL) display devices, or other display devices. In addition, while display system 1 according to the present embodiment includes the four display devices described above, the number of display devices included in display system 1 is not limited to four and any number equal to or larger than two may suffice. Furthermore, hereinafter, the four display devices may also be described as four display devices 11 to 14.

Sensor 21 is a sensor for detecting an environment inside or outside of an automobile. In other words, sensor 21 detects an environment parameter indicating an environment in which four display devices 11 to 14 are disposed. The environment parameter is, for example, illuminance. For example, sensor 21 detects the environment parameter every predetermined period. In addition, for example, sensor 21 notifies image processing unit 110 of the detected environment parameter. There may be one sensor 21 or two or more sensors 21.

Display control device 100 is a device that controls displaying of four display devices 11 to 14 provided in the automobile and includes image processing unit 110, rendering unit 111, first image generating unit 121, second image generating unit 122, third image generating unit 123, fourth image generating unit 124, setting unit 130, and memory 140.

Each of first image generating unit 121, second image generating unit 122, third image generating unit 123, and fourth image generating unit 124 generates an on-screen display. Hereinafter, the four image generating units may also be described as four image generating units 121 to 124. In addition, four image generating units 121 to 124 may be configured with mutually different application software. Each of four image generating units 121 to 124 according to the present embodiment generates an on-screen display being represented in a color that is readily distinguishable by a person with normal color vision or, in other words, an on-screen display for a person with normal color vision or an ordinary on-screen display.

For example, setting unit 130 sets a color display mode as a set display mode in accordance with an input operation by a user such as a passenger of the automobile. For example, setting unit 130 sets a second color set that is one of a plurality of color sets (to be described later) as the set display mode described above. For example, when the user is a person with color-vision deficiency, setting unit 130 sets a second color set in accordance with a type of the color-vision deficiency of the user as the set display mode described above in accordance with an input operation by the user. Note that each of the plurality of color sets is, for example, a set including a plurality of pieces of color information such as red, green, and blue (RGB).

In addition, setting unit 130 stores information indicating a set display mode that has been set, in memory 140 as user setting information d2.

Image processing unit 110 acquires four on-screen displays generated by four image generating units 121 to 124. In addition, image processing unit 110 unifies a color display mode of each of the four on-screen displays. Rendering unit 111 acquires the four on-screen displays of which color display modes have been unified from image processing unit 110 and respectively renders the four on-screen displays on four display devices 11 to 14. Specifically, image processing unit 110 unifies the color display mode of each of the four generated on-screen displays to the set display mode described above and displays each of the four on-screen displays having been unified to the set display mode on four display devices 11 to 14 via rendering unit 111. In a specific example, image processing unit 110 converts a color display mode of the on-screen display generated by first image generating unit 121 into the set display mode and displays the on-screen display of first image generating unit 121 having been converted into the set display mode on center display device 11. In a similar manner, image processing unit 110 converts a color display mode of the on-screen display generated by second image generating unit 122 into the set display mode and displays the on-screen display of second image generating unit 122 having been converted into the set display mode on head-up display device 12. Furthermore, image processing unit 110 converts a color display mode of the on-screen display generated by third image generating unit 123 into the set display mode and displays the on-screen display of third image generating unit 123 having been converted into the set display mode on IC display device 13. Furthermore, image processing unit 110 converts a color display mode of the on-screen display generated by fourth image generating unit 124 into the set display mode and displays the on-screen display of fourth image generating unit 124 having been converted into the set display mode on passenger display device 14.

In addition, image processing unit 110 sequentially accepts a notification of an environment parameter from sensor 21. Furthermore, image processing unit 110 sequentially writes the notified environment parameter into sensor information d3 in memory 140.

Memory 140 is a recording medium for storing various kinds of information. Memory 140 according to the present embodiment stores color conversion information d1, user setting information d2, sensor information d3, and display device information d4. Color conversion information d1 is information for converting a color display mode and includes the plurality of color sets described above. User setting information d2 is information indicating a set display mode having been set by setting unit 130 in accordance with an input operation by the user. Display device information d4 indicates set contents of each of four display devices 11 to 14. Memory 140 may be a volatile recording medium or a non-volatile recording medium. In addition, memory 140 may be a read only memory (ROM), a random access memory (RAM), or the like.

Figure 2:
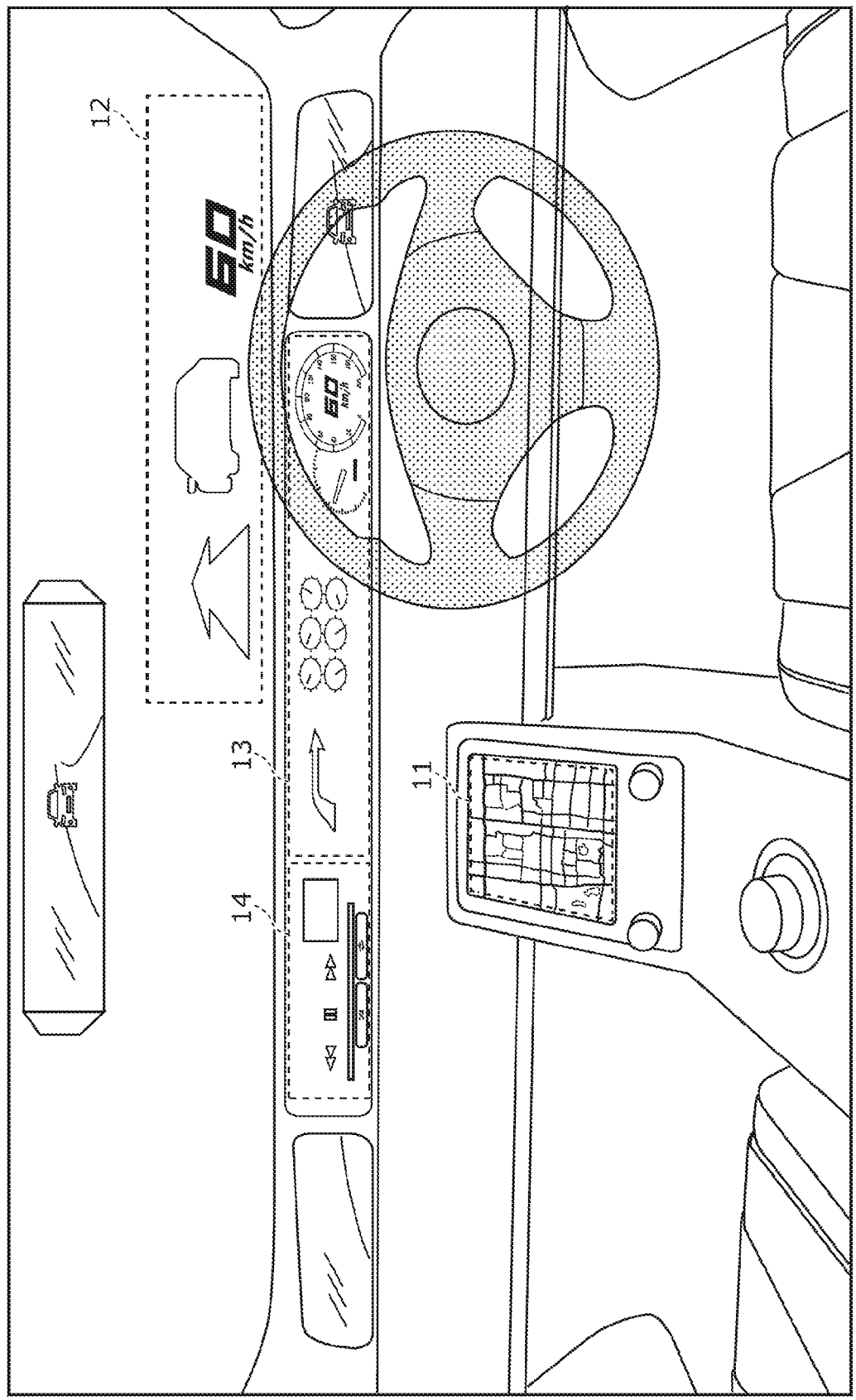
FIG. 2 is an external view illustrating an example of display devices provided in an automobile, according to an embodiment.

FIG. 2 is an external view illustrating an example of four display devices 11 to 14 provided in an automobile.

Center display device 11 is, for example, a display device disposed between a driver's seat and a passenger's seat and displays an on-screen display related to navigation information, media message information, and the like.

Head-up display device 12 is, for example, a display device that irradiates a windshield in front of the driver's seat with video light to cause a driver to visually recognize a virtual image based on the video light which appears through the windshield. In other words, head-up display device 12 displays the virtual image as an on-screen display. For example, head-up display device 12 displays an on-screen display related to turn-by-turn information, points of interest (PoI) information, traffic information, disaster information, driving information, and the like.

IC display device 13 is a display device disposed on an instrument panel and displays, for example, an on-screen display related to measuring instrument information, turn-by-turn information, traffic information, and the like.

Passenger display device 14 is a display device disposed in front of the passenger's seat and displays, for example, an on-screen display related to music information, media message information, and the like.

Note that four display devices 11 to 14 according to the present embodiment are not limited to the arrangements described above and may be disposed at any location. In addition, contents of on-screen displays to be displayed on four display devices 11 to 14 are also not limited to the contents described above and may be any kind of contents.

FIG. 3 is a diagram illustrating an example of color conversion information d1.

For example, as illustrated in FIG. 3, color conversion information d1 indicates information on an original color and information on a color after conversion in association with each other. In addition, the information on the original color is formed from a first color set and the information on the color after conversion is formed from a plurality of second color sets. In other words, color conversion information d1 is formed from a plurality of color sets including a first color set and a plurality of second color sets. Furthermore, the first color set that is the information on the original color is a color set to be used in a normal mode. The plurality of second color sets included in the information on the color after conversion is formed from a second color set used in a first mode, a second color set used in a second mode, and a second color set used in a third mode.

In addition, each of the plurality of color sets includes information on a plurality of colors. Color information is, for example, a set of three numerical values indicated by RGB. For example, the first color set includes RGB=(r1, g1, b1), (r2, g2, b2), (r3, g3, b3), . . . which expresses each piece of color information. Note that r1 to r3, g1 to g3, and b1 to b3 respectively indicate numerical values of red (R), numerical values of green (G), and numerical values of blue (B). In other words, in the present embodiment, a combination of r and a numeral indicates a numerical value of red, a combination of g and a numeral indicates a numerical value of green, and a combination of b and a numeral indicates a numerical value of blue. In a more specific example, a numerical value of each of red, green, and blue is an integer value that ranges from 0 to 255.

Here, color conversion information d1 indicates, in association with each other, each color (in other words, color information) indicated in the first color set and each color (in other words, color information) indicated in each of the three second color sets among the plurality of color sets. For example, as illustrated in FIG. 3, RGB=(r1, g1, b1) of the first color set is associated with RGB=(r11, g11, b11) of the second color set used in the first mode, RGB=(r21, g21, b21) of the second color set used in the second mode, and RGB=(r31, g31, b31) of the second color set used in the third mode. In a similar manner, RGB=(r2, g2, b2) of the first color set is associated with RGB=(r12, g12, b12) of the second color set used in the first mode, RGB=(r22, g22, b22) of the second color set used in the second mode, and RGB=(r32, g32, b32) of the second color set used in the third mode.

For example, when the user is a person with normal color vision, the user selects the normal mode by an input operation to display control device 100. As a result, based on the input operation by the user, setting unit 130 sets the first color set that is a color set corresponding to the normal mode as a set display mode. When the first color set is set as the set display mode or, in other words, when the first color set is indicated in user setting information d2 in memory 140, image processing unit 110 does not perform color conversion with respect to the on-screen displays generated by four image generating units 121 to 124.

On the other hand, when the user is a person with color-vision deficiency, the user selects a mode corresponding to a type of the color-vision deficiency of the user from the first mode, the second mode, and the third mode by an input operation to display control device 100. In a more specific example, when the type of color-vision deficiency of the user is protanopia, the user selects the first mode. In addition, when the type of color-vision deficiency of the user is deuteranopia, the user selects the second mode. Furthermore, when the type of color-vision deficiency of the user is tritanopia, the user selects the third mode.

In accordance with the input operation by the user to display control device 100 or, in other words, selection of a mode, setting unit 130 sets the second color set corresponding to the mode selected by the user among the plurality of second color sets indicated in color conversion information d1 as the set display mode. In other words, each of the plurality of second color sets indicated in color conversion information d1 is a candidate color set to be selected as a set display mode by the user. Therefore, it can be said that the plurality of color sets indicated in color conversion information d1 include the first color set and a plurality of candidate color sets that are a plurality of mutually different second color sets. In addition, with respect to each of the plurality of candidate color sets, color conversion information d1 indicates each color indicated in the first color set and each color indicated in the candidate color set in association with each other. Setting unit 130 sets the second color set that is one candidate color set among the plurality of candidate color sets.

In addition, when the second color set is set as the set display mode or, in other words, when the second color set is indicated in user setting information d2 in memory 140, image processing unit 110 according to the present embodiment performs color conversion with respect to the on-screen displays generated by four image generating units 121 to 124. Specifically, image processing unit 110 refers to color conversion information d1 and, with respect to each of the four on-screen displays generated by four image generating units 121 to 124, converts a color included in the on-screen display and indicated in the first color set into a color indicated in the second color set having been set by setting unit 130 and associated with the color included in the on-screen display and indicated in the first color set. Accordingly, image processing unit 110 unifies a color display mode of each of the four on-screen displays to the set display mode. For example, image processing unit 110 retrieves each color included in the on-screen display generated by first image generating unit 121 from the first color set in color conversion information d1. Next, image processing unit 110 retrieves a color associated with the color in the first color set from a second color set in color conversion information d1. The second color set is a color set having been set as the set display mode by setting unit 130 among the plurality of second color sets (in other words, the plurality of candidate color sets). In addition, image processing unit 110 converts each color included in the on-screen display generated by first image generating unit 121 into the color in the second color set associated with the color included in the on-screen display generated by first image generating unit 121. Accordingly, the on-screen display is converted into an on-screen display of the set display mode. An on-screen display generated by each of second image generating unit 122, third image generating unit 123, and fourth image generating unit 124 is also converted in a similar manner to the on-screen display generated by first image generating unit 121.

As described above, in the present embodiment, the first color set is a color set for a person with normal color vision, and the plurality of candidate color sets are color sets for persons with color vision deficiencies. Here, each of the plurality of candidate color sets is for a different type of color vision deficiency.

Accordingly, for a user who is a person with color-vision deficiency, by once selecting a mode in accordance with the user's own type of color-vision deficiency from the first mode, the second mode, and the third mode, all of the on-screen displays of four display devices 11 to 14 can be unified to a screen that is readily distinguishable to the user. In other words, in accordance with a type of color-vision deficiency, the four on-screen displays displayed on four display devices 11 to 14 can be readily collectively converted into an on-screen display that is readily distinguishable by a person with the type of color-vision deficiency. When the passenger is a person with protanopia as a color-vision deficiency, by having setting unit 130 set the second color set that is a candidate color set for persons with protanopia as a color-vision deficiency, the four on-screen displays can be readily collectively converted into an on-screen display that is readily distinguishable by a person with the color-vision deficiency.

FIG. 4 is a diagram illustrating another example of color conversion information d1.

In color conversion information d1, as illustrated in FIG. 4, a conspicuous color may be associated as a predetermined color with each of the plurality of second color sets. For example, as a conspicuous color to a person with color-vision deficiency who selects the first mode, RGB=(r01, g01, b01) is associated with the second color set of the first mode. In addition, as a conspicuous color to a person with color-vision deficiency who selects the second mode, RGB=(r02, g02, b02) is associated with the second color set of the second mode. Furthermore, as a conspicuous color to a person with color-vision deficiency who selects the third mode, RGB=(r03, g03, b03) is associated with the second color set of the third mode.

Here, when a conspicuous color is associated with the second color set having been set as the set display mode by setting unit 130 and a component image that satisfies a predetermined condition is included in each of the four on-screen displays, image processing unit 110 according to the present embodiment converts a color of the component image into the conspicuous color. The component image that satisfies a predetermined condition is, for example, a component image that requires attention regarding driving of an automobile which may be an image of an arrow indicating a direction of travel of the automobile or an image for calling attention to an obstacle or a passerby. In other words, the component image that satisfies a predetermined condition is, for example, a highly-important component image that requires attention regarding driving of the automobile as described above. More specifically, when an importance is assigned to each component image included in the four on-screen displays, a component image that satisfies a predetermined condition is a component image assigned an importance that is equal to or higher than a threshold.

Accordingly, a color of a highly-important component image for alerting a passenger who is a person with color-vision deficiency among respective component images included in the four on-screen displays can be made appropriately conspicuous to the passenger.

Figure 5:
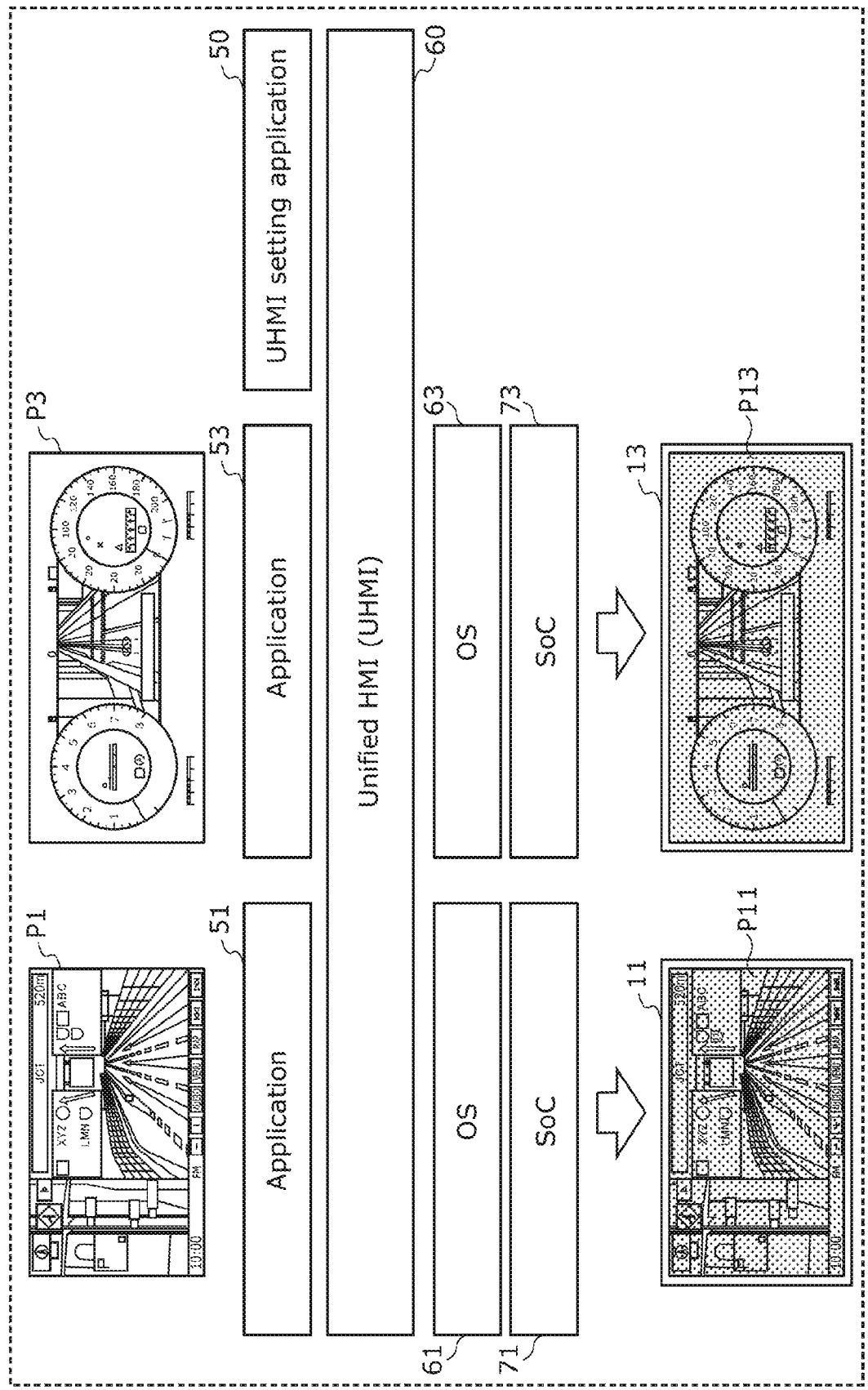
FIG. 5 is a diagram illustrating an example of a specific mode of a display control device according to an embodiment.

FIG. 5 is a diagram illustrating an example of a specific mode of display control device 100. The example illustrated in FIG. 5 represents a specific example of a part of the configuration of display control device 100 illustrated in FIG. 1.

For example, display control device 100 includes application 51, application 53, unified human-machine interface (UHMI) setting application 50, UHMI 60, operating system (OS) 61, OS 63, system on chip (SoC) (71), and SoC 73. Note that these components may be included in a single electronic control unit (ECU).

Each of application 51 and application 53 is application software or, in other words, a computer program that generates an on-screen display. For example, application 51 corresponds to first image generating unit 121 and generates on-screen display P1 for a person with normal color vision. Application 53 corresponds to third image generating unit 123 and generates on-screen display P3 for a person with normal color vision.

UHMI setting application 50 is application software or, in other words, a computer program for setting a set display mode and corresponds to, for example, setting unit 130. UHMI setting application 50 notifies UHMI 60 of the set display mode.

UHMI 60 corresponds to a part of image processing unit 110 and may be configured as software or configured as hardware. UHMI 60 acquires on-screen display P1 and on-screen display P3 from application 51 and application 53. Furthermore, UHMI 60 receives the notification of the set display mode from UHMI setting application 50. In addition, UHMI 60 converts the color display mode of each of on-screen display P1 and on-screen display P3 into the set display mode notified from UHMI setting application 50. For example, on-screen display P1 for a person with normal color vision is converted into on-screen display P11 for a person with color-vision deficiency and on-screen display P3 for a person with normal color vision is converted into on-screen display P13 for a person with color-vision deficiency.

OS 61 and SoC 71 correspond to a part of image processing unit 110, acquire on-screen display P11 from UHMI 60, and displays on-screen display P11 on center display device 11.

OS 63 and SoC 73 correspond to a part of image processing unit 110, acquire on-screen display P13 from UHMI 60, and displays on-screen display P13 on IC display device 13.

As described above, in accordance with a setting by UHMI setting application 50, UHMI 60 converts on-screen display P1 generated by application 51 into on-screen display P11 and, furthermore, converts on-screen display P3 generated by application 53 into on-screen display P13. In other words, on-screen displays P1 and P3 for a person with normal color vision are collectively converted into on-screen displays P11 and P13 for a person with color-vision deficiency. As a result, the on-screen display that is displayed on each of center display device 11 and IC display device 13 can be unified to an on-screen display for a person with color-vision deficiency.

Note that, in the example illustrated in FIG. 5, an application corresponding to each of second image generating unit 122 and fourth image generating unit 124 as well as an OS and an SoC corresponding to the application have been omitted for the sake of brevity.

Figure 6:
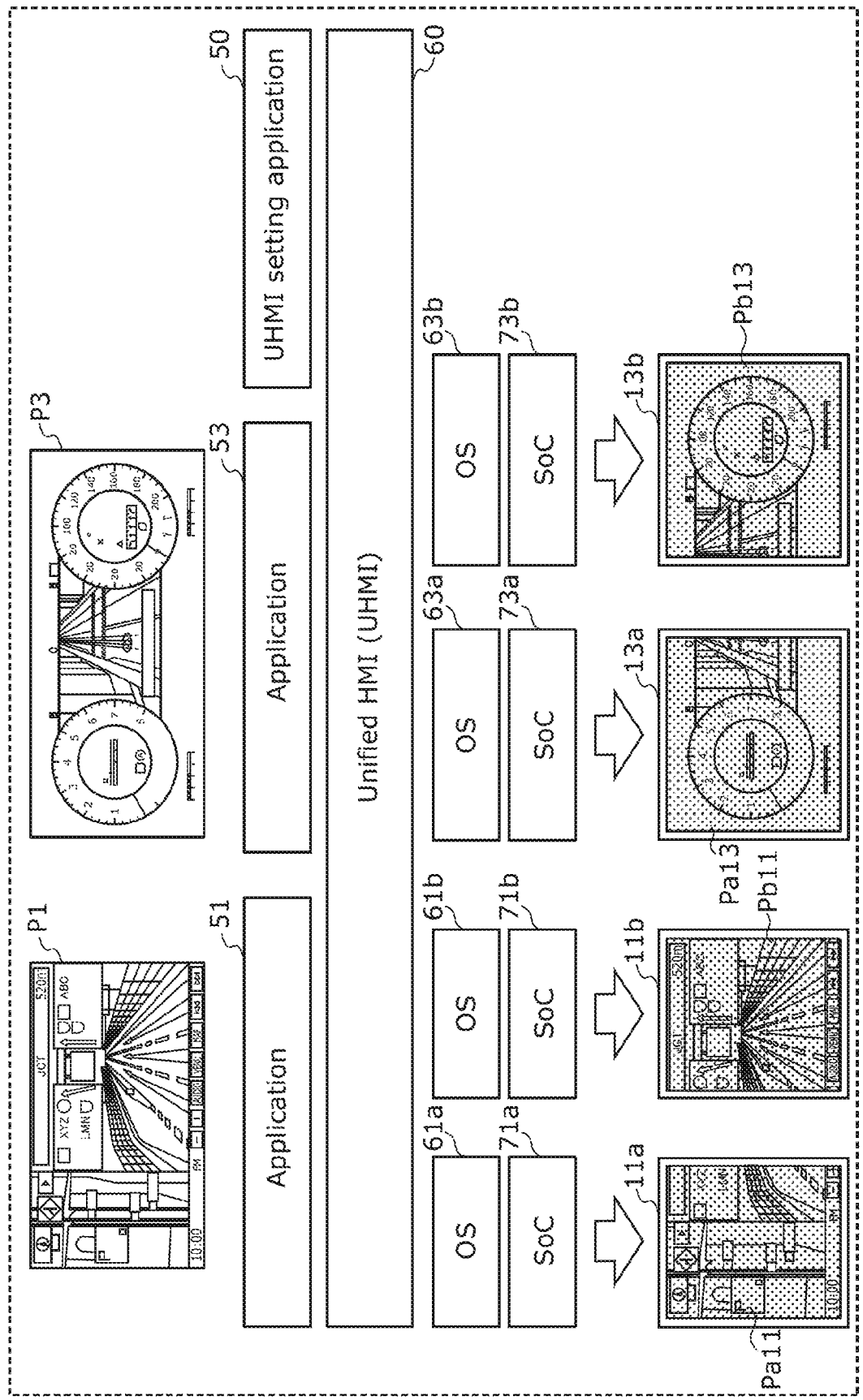
FIG. 6 is a diagram illustrating another example of a specific mode of a display control device according to an embodiment.

FIG. 6 is a diagram illustrating another example of a specific mode of display control device 100.

For example, as illustrated in FIG. 6, center display device 11 may be divided into first center display device 11a and second center display device 11b and IC display device 13 may be divided into first IC display device 13a and second IC display device 13b. In such a case, OS 61 may be divided into OS 61a and OS 61b and SoC 71 may be divided into SoC 71a and SoC 71b. In a similar manner, OS 63 may be divided into OS 63a and OS 63b and SoC 73 may be divided into SoC 73a and SoC 73b.

After converting on-screen display P1 into on-screen display P11, UHMI 60 divides on-screen display P11 into on-screen display Pa11 and on-screen display Pb11. In addition, OS 61a and SoC 71a display on-screen display Pa11 on first center display device 11a. OS 61b and SoC 71b display on-screen display Pb11 on second center display device 11b.

In a similar manner, after converting on-screen display P3 into on-screen display P13, UHMI 60 divides on-screen display P13 into on-screen display Pa13 and on-screen display Pb13. In addition, OS 63a and SoC 73a display on-screen display Pa13 on first IC display device 13a. OS 63b and SoC 73b display on-screen display Pb13 on second IC display device 13b.

Even in such a case, display control device 100 produces a similar working-effect to the example illustrated in FIG. 5.

Figure 7:
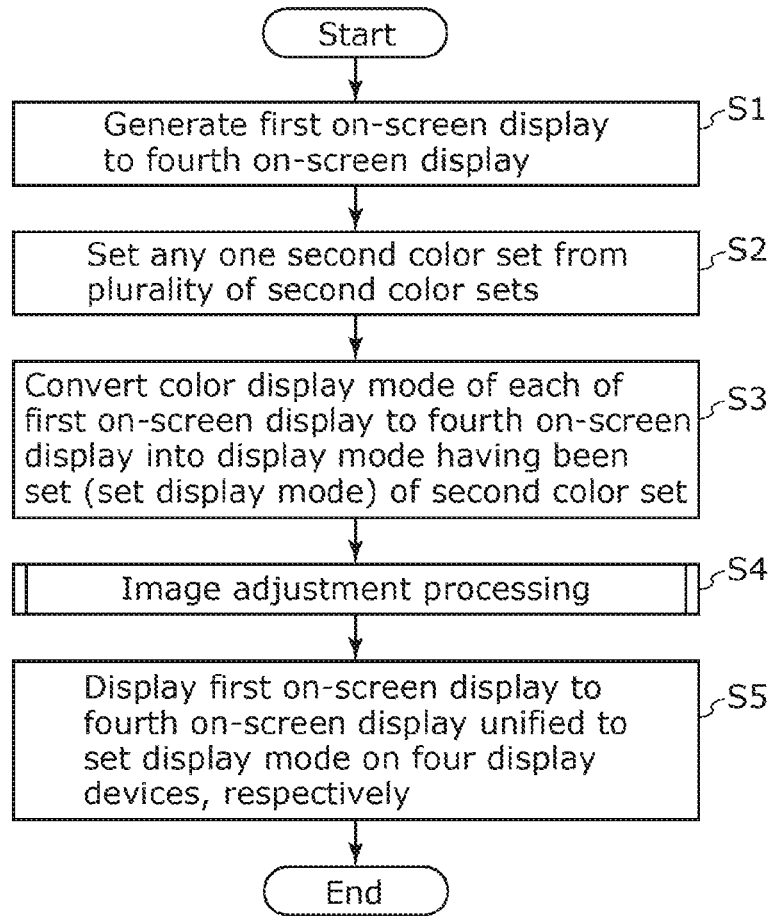
FIG. 7 is a flowchart illustrating an example of a processing operation of a display control device according to an embodiment.

FIG. 7 is a flowchart illustrating an example of a processing operation of display control device 100.

First, display control device 100 generates a plurality of on-screen displays (step S1). Specifically, four image generating units 121 to 124 generate four on-screen displays as a first on-screen display to a fourth on-screen display. Next, based on an input operation by a user who is a passenger or the like, setting unit 130 sets any one second color set among the plurality of second color sets being a plurality of candidate color sets as a set display mode (step S2).

In addition, image processing unit 110 converts a color display mode of each of the first on-screen display to the fourth on-screen display into a display mode of the second color set having been set in step S2 (in other words, the set display mode) (step S3).

Next, image processing unit 110 performs screen adjustment processing (step S4).

In addition, image processing unit 110 displays the first on-screen display to the fourth on-screen display of which color display modes have been unified to the set display mode on four display devices 11 to 14, respectively (step S5).

While display control device 100 according to the present embodiment executes the screen adjustment processing of step S4, the screen adjustment processing need not be executed.

Figure 8:
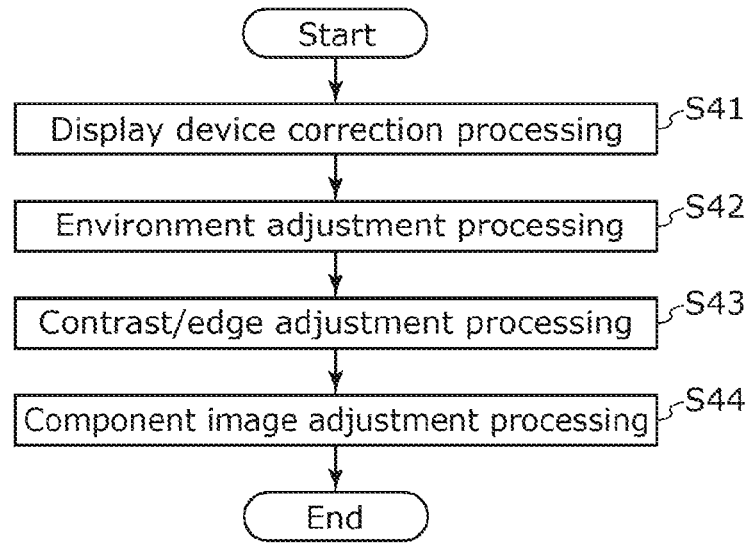
FIG. 8 is a flowchart illustrating a specific example of the screen adjustment processing according to an embodiment.

FIG. 8 is a flowchart illustrating a specific example of the screen adjustment processing. The screen adjustment processing is the processing of step S4 in FIG. 7.

First, image processing unit 110 performs display device correction processing (step S41). In the display device correction processing, image processing unit 110 reads display device information d4 stored in memory 140. As described above, display device information d4 indicates set contents of each of four display devices 11 to 14. The set contents are, for example, at least one of a physical size, a resolution, a brightness, and a tone of a display device and may be specifications of the display device. Note that the brightness indicated as set contents may be a range of brightness (in other words, a dynamic range) that can be expressed by the display device. Based on display device information d4, image processing unit 110 specifies set contents of four display devices 11 to 14 and corrects an image parameter of each of the first on-screen display to the fourth on-screen display in accordance with the set contents to unify the image parameters. The image parameter is, for example, at least one of a size, a resolution, a brightness, and a tone of an on-screen display.

More specifically, image processing unit 110 identifies a minimum size from the physical sizes of four display devices 11 to 14 which are indicated as set contents in display device information d4. In addition, when each of the sizes of one or more on-screen displays among the first on-screen display to the fourth on-screen display is not the minimum size described above, image processing unit 110 converts the size of each of the one or more on-screen displays into the minimum size. As a result, the size of each of the first on-screen display to the fourth on-screen display is unified to the minimum size.

Alternatively, image processing unit 110 identifies a minimum resolution from the resolutions of four display devices 11 to 14 which are indicated as set contents in display device information d4. In addition, when each of the resolutions of one or more on-screen displays among the first on-screen display to the fourth on-screen display is not the minimum resolution described above, image processing unit 110 converts the resolution of each of the one or more on-screen displays into the minimum resolution. As a result, the resolution of each of the first on-screen display to the fourth on-screen display is unified to the minimum resolution.

Note that the set contents indicated by display device information d4 may be a color temperature, a refresh rate, or a display mode such as a video mode or a game mode. Based on such set contents, image processing unit 110 adjusts the image parameter of each of the first on-screen display to the fourth on-screen display and unifies the color temperature or the like of the on-screen displays being displayed on four display devices 11 to 14.

Next, image processing unit 110 performs environment adjustment processing (step S42). In the environment adjustment processing, image processing unit 110 reads sensor information d3 stored in memory 140. As described earlier, sensor information d3 indicates an environment parameter such as illuminance detected by sensor 21. By reading sensor information d3, image processing unit 110 specifies a present or latest environment parameter. In addition, image processing unit 110 changes the color display mode of each of the first on-screen display to the fourth on-screen display in accordance with the environment parameter. For example, when the environment parameter is illuminance, the higher the present or latest illuminance, the higher the illuminance of each of the first on-screen display to the fourth on-screen display set by image processing unit 110, and the lower the present or latest illuminance, the lower the illuminance of each of the first on-screen display to the fourth on-screen display set by image processing unit 110. Image processing unit 110 displays the first on-screen display to the fourth on-screen display of which brightness has been increased or the first on-screen display to the fourth on-screen display of which brightness has been reduced on four display devices 11 to 14.

As described above, image processing unit 110 according to the present embodiment obtains, from sensor 21, an environment parameter indicating an environment in which four display devices 11 to 14 are disposed, and changes the color display mode of each of the first on-screen display to the fourth on-screen display according to the environment parameter. Accordingly, even when the environment changes, the first on-screen display to the fourth on-screen display can be made readily visible in the environment.

Next, image processing unit 110 performs contrast/edge adjustment processing (step S43). In the contrast/edge adjustment processing, for example, image processing unit 110 specifies intensities of a contrast and an edge of each of the first on-screen display to the fourth on-screen display. In this case, for example, the contrast is a difference in lightness or brightness between a brightest pixel and a darkest pixel in an on-screen display. In addition, for example, image processing unit 110 calculates an average value of intensities of the contrast and an average value of intensities of the edge. Image processing unit 110 changes the intensity of the contrast of each of the first on-screen display to the fourth on-screen display to the average value of intensities of the contrast having been calculated as described above and changes the intensity of the edge of each of the first on-screen display to the fourth on-screen display to the average value of intensities of the edge having been calculated as described above. Image processing unit 110 displays each of the first on-screen display to the fourth on-screen display of which intensities of contrasts or edges have been changed on four display devices 11 to 14.

As described above, image processing unit 110 according to the present embodiment adjusts at least one of a contrast and an edge of the colors of the first on-screen display to the fourth on-screen display to unify an intensity of the at least one of the contrast and the edge.

Accordingly, an intensity of a contrast of each of the first on-screen display to the fourth on-screen display can be readily unified. Alternatively, an intensity of an edge of each of the first on-screen display to the fourth on-screen display can be readily unified. Setting unit 130 may set an intensity of at least one of a contrast and an edge as a set intensity in accordance with an input operation by the user. In this case, image processing unit 110 may unify an intensity of at least one of the contrast and the edge of the colors of the first on-screen display to the fourth on-screen display to the set intensity.

Next, image processing unit 110 performs component image adjustment processing (step S44). In the component image adjustment processing, image processing unit 110 refers to color conversion information d1 illustrated in FIG. 4. In addition, image processing unit 110 identifies a conspicuous color being associated with a second color set having been set as the set display mode by setting unit 130 in color conversion information d1. Next, image processing unit 110 converts a color of a component image satisfying a predetermined condition and being included in each of the first on-screen display to the fourth on-screen display into the conspicuous color. Image processing unit 110 displays each of the first on-screen display to the fourth on-screen display including a component image having been converted into the conspicuous color on four display devices 11 to 14.

As described above, in display control device 100 according to the present embodiment, when a set display mode is set by setting unit 130, the color display modes of the four on-screen displays generated by the four image generating units 121 to 124 are unified to the set display mode. Therefore, a configuration for converting a color display mode need not be individually provided with respect to each of the four on-screen displays and the color display modes of the four on-screen displays can be collectively converted into the set display mode by image processing unit 110. In addition, when the setting by setting unit 130 is performed in accordance with an input operation by a user, the user who is a passenger on an automobile or the like can be spared from having to individually operate settings of a color display mode with respect to each of the four on-screen displays. Therefore, each color display mode of the four on-screen displays can be readily converted in a unified manner. In other words, a sense of unity of the color display modes can be prevented from becoming impaired. As a result, from the perspective of development, design, or manufacturing of the display control device as well as the perspective of use of the display control device by the user, a burden of color conversion can be reduced.

In addition, in display control device 100 according to the present embodiment, setting unit 130 sets a second color set, among a plurality of color sets, as a set display mode. In addition, image processing unit 110 refers to color conversion information d1 which indicates, in association with each other, each color indicated in the first color set among the plurality of color sets and each color indicated in the second color set. Next, image processing unit 110 unifies the color display mode of each of the four on-screen displays to the set display mode by converting, for each of the plurality of on-screen displays, a color which is included in the on-screen display and indicated in the first color set into a color which is indicated in the second color set and associated with the color indicated in the first color set.

Accordingly, a color included in each of the four on-screen displays is converted into a different color in the second color set of color conversion information d1 and which is associated with the color included in each of the plurality of on-screen displays. Therefore, when each color indicated in the second color set is readily distinguishable by a person with color-vision deficiency, the four on-screen displays can be readily collectively converted into an on-screen display that is readily distinguishable by the person with color-vision deficiency.

Furthermore, in display control device 100 according to the present embodiment, the plurality of color sets include the first color set and a plurality of candidate color sets which are mutually different. Setting unit 130 sets one candidate color set among the plurality of candidate color sets as the second color set. Furthermore, for each of the plurality of candidate color sets, the color conversion information indicates, in association with each other, each color indicated in the first color set and each color indicated in the candidate color set. Here, the first color set is a color set for a person with normal color vision, and the plurality of candidate color sets are color sets for persons with color vision deficiencies. Here, each of the plurality of candidate color sets is for a different type of color vision deficiency.

Accordingly, in accordance with a type of color-vision deficiency, the four on-screen displays displayed on the four display devices 11 to 14 can be readily collectively converted into an on-screen display that is readily distinguishable by a person with that type of color-vision deficiency. Examples of types of color-vision deficiency include protanopia and deuteranopia. When the passenger is a person with protanopia as a color-vision deficiency, by having setting unit 130 set, as the second color set, a candidate color set for a person with protanopia as a color-vision deficiency, the four on-screen displays can be readily collectively converted into an on-screen display that is readily distinguishable by the person with that color-vision deficiency.

Although the display control device according to the present disclosure has been described above based on the foregoing embodiments, the present disclosure is not limited to the foregoing embodiments. Forms obtained by making various modifications to the foregoing embodiments which may be conceived by those skilled in the art, without departing from the essence of the present disclosure, may be included in the present disclosure.

For example, although the four display devices 11 to 14 are provided in an automobile in the forgoing embodiments, they may be provided in a vehicle other than an automobile, in a facility, or the like, as long as they are placed for visual recognition by one user.

Furthermore, the environment parameter is illuminance in the foregoing embodiments, but may be a parameter other than illuminance.

Furthermore, although the color representation method indicated by color conversion information d1 in the foregoing embodiments is RGB, a color representation method other than RGB, such as YUV, or the like, may be indicated in color conversion information d1.

Furthermore, although the second color set is included in the color conversion information for each type of color-vision deficiency in the foregoing embodiments, a plurality of second color sets in accordance with the preference of the user may be included in the color conversion information.

It should be noted that, in the foregoing embodiments, each of the structural components are configured in the form of an exclusive hardware product, but may be realized by executing a software program suitable for the structural component. Each of the structural components may be realized by means of a program executer, such as a central processing unit (CPU) or a processor, reading and executing the software program recorded on a recording medium such as a hard disk or a semiconductor memory. Here, the software program for implementing the display control device according to the respective embodiments described above is a computer program for causing a computer to execute the respective steps in the flowcharts in FIG. 7 and FIG. 8.

Moreover, the present disclosure also includes the subsequent cases.

(1) Specifically, at least one device described above may be a computer system configured with, for example, a microprocessor, a ROM, a RAM, a hard disk unit, a display unit, a keyboard, and a mouse. The RAM or the hard disk unit stores a computer program. The microprocessor operates according to the computer program, so that each function of the at least one device is achieved. Here, the computer program includes a plurality of instruction codes indicating instructions to be given to the computer so as to achieve a specific function.

(2) Some or all of the structural components included in at least one device described above may be realized as a single system large scale integration (LSI). The system LSI is a super multifunctional LSI manufactured by integrating a plurality of structural components onto a signal chip. To be more specific, the system LSI is a computer system configured with a microprocessor, a ROM, and a RAM, for example. The RAM stores a computer program. The microprocessor operates according to the computer program, so that a function of the system LSI is achieved.

(3) Some or all of the components included in at least one device described above may be implemented as an IC card or a standalone module that can be inserted into and removed from the corresponding device. The IC card or the module is a computer system configured with a microprocessor, a ROM, and a RAM, for example. The IC card or the module may include the aforementioned super multifunctional LSI. The microprocessor operates according to the computer program, so that a function of the IC card or the module is achieved. The IC card or the module may be tamper-resistant.

(4) The present disclosure may be the methods described above. Each of the methods may be a computer program causing a computer to execute the steps included in the method. Moreover, the present disclosure may be a digital signal of the computer program.

Moreover, the present disclosure may be the aforementioned computer program or digital signal recorded on a computer-readable recording medium, such as a flexible disk, a hard disk, a CD (compact disc)-ROM, a DVD, a DVD-ROM, a DVD-RAM, a Blu-ray (registered trademark) disc (BD), or a semiconductor memory. The present disclosure may also be the digital signal recorded on such a recording medium.

Furthermore, the present disclosure may be the aforementioned computer program or digital signal transmitted via a telecommunication line, a wireless or wired communication line, a network represented by the Internet, and data broadcasting.

Furthermore, by transferring the recording medium having the aforementioned program or digital signal recorded thereon or by transferring the aforementioned program or digital signal via the aforementioned network or the like, the present disclosure may be implemented by a different independent computer system.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in its entirety: Japanese Patent Application No. 2021-160425 filed on Sep. 30, 2021.

INDUSTRIAL APPLICABILITY

The display control device according to the present disclosure can be applied to a device, or the like, that controls a plurality of display devices provided in an automobile, for example.

The invention claimed is:

1. A display control device that controls a plurality of display devices provided in an automobile, the display control device comprising:
a plurality of image generating circuits that generate a plurality of on-screen displays;
a setting circuit that sets a color display mode as a set display mode; and
an image processing circuit that unifies a color display mode of each of the plurality of on-screen displays generated to the set display mode, and displays each of the plurality of on-screen displays that have been unified to the set display mode on a different one of the plurality of display devices, wherein the setting circuit sets a first color set associated with normal vision, a first mode color set associated with a first color vision deficiency, a second mode color set associated with a second color vision deficiency, and a third mode color set associated with a third color vision deficiency, wherein the setting circuit generates component images each with an alert indicator arising when a predetermined importance threshold that correlates with the first, second, and third color vision deficiencies is met, the component images each with the alert indicator is generated in:

the first mode color set associated with the first color vision deficiency based on a second color component of the first mode color set;

the second mode color set associated with the second color vision deficiency based on a second color component of the second mode color set; and the third mode color set associated with the third color vision deficiency based on a second color component of the third mode color set, and wherein the imaging processing circuit generates the component images each with the alert indicator that correlates with the first, second, and third color vision deficiencies.

2. The display control device according to claim 1, wherein the image processing circuit unifies the color display mode of each of the plurality of on-screen displays to the set display mode by:

referring to color conversion information which indicates, in association with each other, each color indicated in the first color set, each color indicated in the first mode color set, each color indicated in the second mode color set, and each color indicated in the third mode color set; and for each of the plurality of on-screen displays, converting a color which is included in the on-screen display and indicated in association with the each other color.

3. The display control device according to claim 2, wherein the first color set, the first mode color set, the second mode color set, and the third mode color set are mutually different, and for each of the first mode, second mode, and third mode color sets, the color conversion information indicates, in association with each other, each color indicated in the first color set and each color indicated in the first mode, second mode, and third mode color sets.

4. The display control device according to claim 3, wherein the first color vision deficiency includes protanopia, the second color vision deficiency includes deuteranopia, and the third color vision deficiency includes tritanopia.

5. The display control device according to claim 1, wherein the image processing circuit further adjusts at least one of a contrast or an edge of colors of the plurality of on-screen displays to unify an intensity of the at least one of the contrast or the edge.

6. The display control device according to claim 1, wherein the image processing circuit further obtains, from a sensor, an environment parameter indicating an environment in which the plurality of display devices are disposed, and changes the color display mode of each of the plurality of on-screen displays according to the environment parameter.

7. The display control device according to claim 1, wherein the alert indicator includes an alert calling attention to at least one of an obstacle, a passerby, or an arrow indicating a direction of travel of the automobile.

8. A display system comprising:

a plurality of display devices provided in an automobile;

a plurality of image generating circuits that generate a plurality of on-screen displays;

a setting circuit that sets a color display mode as a set display mode; and an image processing circuit that unifies a color display mode of each of the plurality of on-screen displays generated to the set display mode, and displays each of the plurality of on-screen displays that have been unified to the set display mode on a different one of the plurality of display devices, wherein the setting circuit sets a first color set associated with normal vision, a first mode color set associated with a first color vision deficiency, a second mode color set associated with a second color vision deficiency, and a third mode color set associated with a third color vision deficiency, wherein the setting circuit generates component images each with an alert indicator arising when a predetermined importance threshold that correlates with the first, second, and third color vision deficiencies is met, the component images each with the alert indicator is generated in:

the first mode color set associated with the first color vision deficiency based on a second color component of the first mode color set;

the second mode color set associated with the second color vision deficiency based on a second color component of the second mode color set; and the third mode color set associated with the third color vision deficiency based on a second color component of the third mode color set, and wherein the imaging processing circuit generates the component images each with the alert indicator that correlates with the first, second, and third color vision deficiencies.

9. A display control method of controlling a plurality of display devices provided in an automobile, the display control method comprising:

generating a plurality of on-screen displays;

setting a color display mode as a set display mode; and unifying a color display mode of each of the plurality of on-screen displays generated to the set display mode, and displaying each of the plurality of on-screen displays that have been unified to the set display mode on a different one of the plurality of display devices, wherein the setting the color display mode includes setting a first color set associated with normal vision, a first mode color set associated with a first color vision deficiency, a second mode color set associated with a second color vision deficiency, and a third mode color set associated with a third color vision deficiency, wherein the setting the color display mode further includes generating component images each with an alert indicator arising when a predetermined importance threshold that correlates with the first, second, and third color vision deficiencies is met, the component images each with the alert indicator is generated in:

the first mode color set associated with the first color vision deficiency based on a second color component of the first mode color set;

the second mode color set associated with the second color vision deficiency based on a second color component of the second mode color set; and the third mode color set associated with the third color vision deficiency based on a second color component of the third mode color set, and wherein the unifying a color display mode includes generating the component images each with the alert indicator that correlates with the first, second, and third color vision deficiencies.

\* \* \* \* \*